US009331967B2

(12) United States Patent
Gangadharan et al.

(10) Patent No.: US 9,331,967 B2
(45) Date of Patent: May 3, 2016

(54) BROWSER/HTML FRIENDLY PROTOCOL FOR REAL-TIME COMMUNICATION SIGNALING

(71) Applicant: Oracle International Corporation, Redwood Shores, CA (US)

(72) Inventors: Binod Pankajakshy Gangadharan, Bangalore (IN); Terje Strand, Redwood Shores, CA (US); Xiaoyan Sun, Beijing (CN); Shuquan Zhang, Beijing (CN); Boris Selitser, Castro Valley, CA (US); Honggang Frank Zhu, Roswell, CA (US); Karthic Loganathan, New Albany, OH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 138 days.

(21) Appl. No.: 14/069,308

(22) Filed: Oct. 31, 2013

(65) Prior Publication Data
US 2014/0222930 A1 Aug. 7, 2014

Related U.S. Application Data

(63) Continuation-in-part of application No. 13/758,768, filed on Feb. 4, 2013.

(51) Int. Cl.
*G06F 15/16* (2006.01)
*H04L 12/58* (2006.01)
(Continued)

(52) U.S. Cl.
CPC .............. *H04L 51/04* (2013.01); *H04L 45/021* (2013.01); *H04L 67/141* (2013.01)

(58) Field of Classification Search
CPC ...... H04L 51/04; H04L 67/141; H04L 45/021
See application file for complete search history.

(56) References Cited

U.S. PATENT DOCUMENTS

| 6,760,417 | B1 | 7/2004 | Wallenius |
| 7,136,913 | B2 | 11/2006 | Linderman |

(Continued)

FOREIGN PATENT DOCUMENTS

WO 2014007708 1/2014

OTHER PUBLICATIONS

Ericson et al.; JSR 309 Overview of Media Server Control API; Sep. 30, 2009; Oracle USA, Inc. and Hewlett-Packard Company; Version 1.0.*

(Continued)

*Primary Examiner* — Yves Dalencourt
(74) *Attorney, Agent, or Firm* — Tucker Ellis LLP

(57) ABSTRACT

In accordance with an embodiment, described herein is a system for real-time communication signaling protocol for use in a telecommunication network and communication in web-only Internet. The protocol facilitates adapting complex signaling on the server-side into simple operations towards the Web. In an embodiment the protocol is used to communicate between a server-side web signaling engine and a client-side communication controller. The client-side communication controller provides a JavaScript API to encapsulate the signaling layer. The web signaling engine includes a controller which terminates communications using the protocol, and normalizes communications into an internal protocol suitable for communication with telecommunications network systems. In an embodiment, the protocol utilizes JSON and a WebSocket connection and can be defined as a WebSocket subprotocol.

20 Claims, 7 Drawing Sheets

(51) Int. Cl.
*H04L 12/755* (2013.01)
*H04L 29/08* (2006.01)

(56) References Cited

U.S. PATENT DOCUMENTS

| | | | |
|---|---|---|---|
| 7,483,438 B2 | 1/2009 | Serghi | |
| 7,716,240 B2* | 5/2010 | Lim | 707/781 |
| 8,060,604 B1 | 11/2011 | Breau | |
| 8,185,548 B2* | 5/2012 | Lim | 707/781 |
| 8,296,409 B2* | 10/2012 | Banerjee et al. | 709/223 |
| 8,630,299 B1 | 1/2014 | Afshar | |
| 9,038,082 B2* | 5/2015 | Maes | 718/104 |
| 2002/0025795 A1 | 2/2002 | Sharon | |
| 2003/0028790 A1 | 2/2003 | Bleumer | |
| 2004/0009762 A1 | 1/2004 | Bugiu | |
| 2005/0245230 A1 | 11/2005 | Benco | |
| 2005/0262075 A1 | 11/2005 | Beartusk | |
| 2006/0248198 A1 | 11/2006 | Galchev | |
| 2007/0106801 A1 | 5/2007 | Jansson | |
| 2007/0143470 A1 | 6/2007 | Sylvain | |
| 2007/0156659 A1* | 7/2007 | Lim | 707/3 |
| 2008/0103923 A1 | 5/2008 | Rieck | |
| 2008/0189421 A1 | 8/2008 | Langen | |
| 2008/0271113 A1 | 10/2008 | Belling | |
| 2009/0141704 A1* | 6/2009 | Eng et al. | 370/352 |
| 2009/0265607 A1 | 10/2009 | Raz | |
| 2009/0268715 A1 | 10/2009 | Jansson | |
| 2010/0114994 A1* | 5/2010 | Huang et al. | 707/811 |
| 2010/0142515 A1* | 6/2010 | Jana et al. | 370/352 |
| 2010/0183131 A1* | 7/2010 | Chang | 379/93.12 |
| 2010/0223287 A1* | 9/2010 | Lim | 707/769 |
| 2011/0072144 A1 | 3/2011 | Fikouras | |
| 2011/0082920 A1 | 4/2011 | Bhattacharya | |
| 2011/0107156 A1 | 5/2011 | Miyata | |
| 2011/0209181 A1 | 8/2011 | Gupta | |
| 2011/0258305 A1* | 10/2011 | Chen et al. | 709/223 |
| 2011/0258597 A1* | 10/2011 | Chen et al. | 717/107 |
| 2012/0016932 A1* | 1/2012 | de Castro, Jr. et al. | 709/203 |
| 2012/0045040 A1* | 2/2012 | Maes | 379/67.1 |
| 2012/0072548 A1* | 3/2012 | Kim | 709/219 |
| 2012/0144416 A1 | 6/2012 | Wetzer | |
| 2012/0178420 A1 | 7/2012 | Ould | |
| 2012/0233216 A1* | 9/2012 | Lim | 707/781 |
| 2012/0317474 A1* | 12/2012 | Parreira | 715/234 |
| 2013/0013804 A1* | 1/2013 | Traynor | 709/232 |
| 2013/0042152 A1 | 2/2013 | Fryc | |
| 2013/0058262 A1* | 3/2013 | Parreira | 370/276 |
| 2013/0067333 A1* | 3/2013 | Brenneman | 715/721 |
| 2013/0073393 A1 | 3/2013 | Nasr | |
| 2013/0094445 A1* | 4/2013 | De Foy et al. | 370/328 |
| 2013/0097239 A1* | 4/2013 | Brown et al. | 709/204 |
| 2013/0104030 A1* | 4/2013 | Parreira | 715/234 |
| 2013/0232217 A1 | 9/2013 | Kristiansson | |
| 2014/0007083 A1* | 1/2014 | Baldwin et al. | 717/178 |
| 2014/0026120 A1* | 1/2014 | Gu et al. | 717/124 |
| 2014/0040437 A1 | 2/2014 | Mitsuya | |
| 2014/0044123 A1* | 2/2014 | Lawson et al. | 370/352 |
| 2014/0075472 A1 | 3/2014 | Mitsuya | |
| 2014/0126714 A1* | 5/2014 | Sayko | 379/265.09 |
| 2014/0156725 A1* | 6/2014 | Mandyam | 709/203 |
| 2014/0181949 A1* | 6/2014 | Hunter | 726/11 |
| 2014/0195588 A1 | 7/2014 | Badge | |
| 2014/0280522 A1* | 9/2014 | Watte | 709/203 |
| 2015/0022619 A1 | 1/2015 | Aleixo Dinis Lopes | |
| 2015/0195309 A1 | 7/2015 | Opsenica | |

OTHER PUBLICATIONS

Kulkarni et al.; SIP Servlet, JSR 289 Specification; Aug. 1, 2008; BEA Systems, Inc.; Version 1.1.*

Unknown Author, Oracle Communications Services Gatekeeper, Concepts and Architectural Overview, Release 4.1, Jan. 2009, pp. 1-1-A10.

Unknown Author, BEA WebLogic Network Gatekeeper, Architectural Overview, Version 3.0, Sep. 14, 2007, pp. i-C14.

Chen, et al, Applying SOA and Web 2.0 to Telecom: Legacy and IMS Next-Generation Architectures, 2008, pp. 374-379, IEEE International Conference on e-Business Engineering.

* cited by examiner

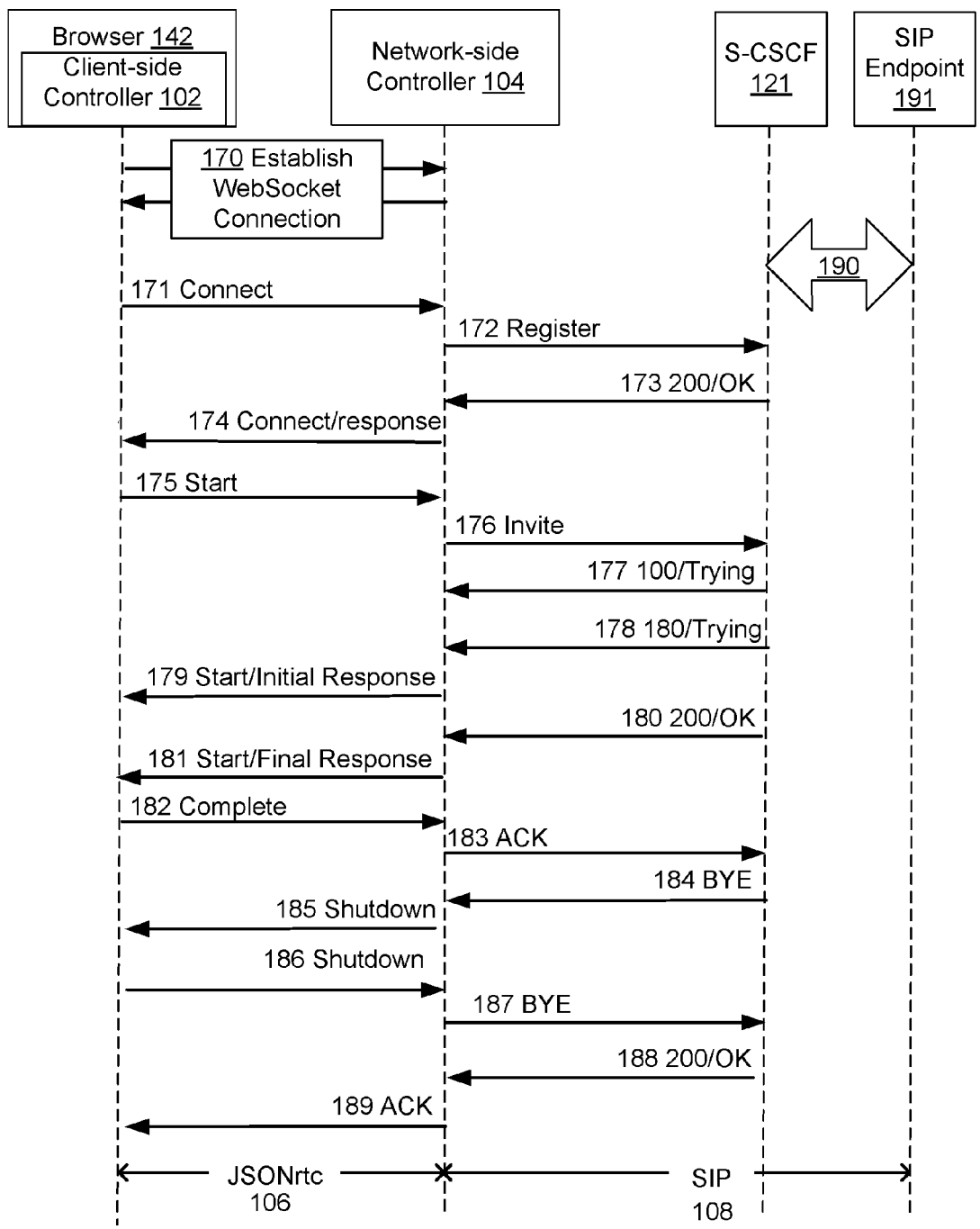

BROWSER/HTML FRIENDLY PROTOCOL FOR REAL-TIME COMMUNICATION SIGNALING

CLAIM OF PRIORITY

This patent application is a continuation-in-part continuation of U.S. patent application Ser. No. 13/758,768, entitled "Real-Time Communication Signaling Gateway" filed Feb. 4, 2013 (Inventors: Honggang frank Zhu, Boris Selitser, and Karthic Loganathan), which application is incorporated herein by reference in its entirety.

RELATED CASES

This patent application is related to the following patent applications, which are hereby incorporated by reference in their entirety:

U.S. Patent Application titled "SYSTEM AND METHOD FOR EXTENDING IP MULTIMEDIA SUBSYSTEM TO HTML5 ENVIRONMENTS", application Ser. No. 14/069,214, filed Oct. 31, 2013;

U.S. Patent Application titled "JAVASCRIPT API FOR WEBRTC", application Ser. No. 14/069,236, filed Oct. 31, 2013;

U.S. Patent Application titled "INTEGRATED WEB-ENABLED SESSION BORDER CONTROLLER", filed Oct. 31, 2013;

U.S. Patent Application titled "GENERIC MODEL FOR CUSTOMIZING PROTOCOL BEHAVIOR THROUGH JAVASCRIPT", application Ser. No. 14/069,297, filed Oct. 31, 2013; and U.S. Patent Application titled "JAVA API FOR PROGRAMMING WEB REAL TIME COMMUNICATION APPLICATIONS", application Ser. No. 14/069,263, filed Oct. 31, 2013.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to a system and method for communicating in a web-only internet and telecommunication network, including extending telecommunications networks to the Web environment. In particular, the present invention relates to a protocol for real-time communication signaling between an HTML environment and the IMS core of a telecommunications network.

BACKGROUND

With the explosive proliferation of IP-enabled mobile and fixed devices capable of offering Web, telecom and entertainment services, such as 3G/4G-enabled smart phones, TVs, home appliances, gaming consoles, and automobiles, among others, operators of mobile, broadband and fixed networks are faced with the operational and business challenges of delivering innovative IP-based communication services with maximum profitability. In order to achieve this goal, customers are increasingly migrating away from expensive, closed, proprietary and application-specific legacy platforms, and towards low-cost, open, standards-based unified converged application platforms, which dramatically lower the time and cost of adding new features and extensions to existing IP-based communication services.

Session Initiation Protocol (SIP) is a control (signaling) protocol developed to manage interactive multimedia IP sessions including IP telephony, presence, and instant messaging. SIP is widely used in telecommunication networks. SIP and other communications centric protocols are complex, and their implementation requires significant domain expertise. However, SIP is not readily compatible with HTTP and use in the Internet domain.

The IP Multimedia Subsystem (IMS) is an architecture for an integrated network of telecommunications carriers that would facilitate the use of IP (Internet Protocol) for packet communications in all known forms over wireless or landline. Examples of such packet communications include traditional telephony, fax, e-mail, Voice over IP (VoIP), instant messaging (IM), videoconference sessions and video on demand (VoD). IMS uses a Voice-over-IP (VoIP) and runs over the standard Internet Protocol (IP). IMS gives network operators and service providers the ability to control and charge for each service. IMS architecture has the capability to support existing phone systems (both packet-switched and circuit-switched). Thus, IMS provides the interoperability, security, session management and QoS capabilities that telecommunications providers lack and desire. IMS is the de facto standard for next-generation networks.

HyperText Markup Language (HTML) is the main markup language for creating web pages and other information that can be displayed in a web browser. HTML is written in the form of HTML elements consisting of tags. HTML elements form the building blocks of all websites. HTML allows images and objects to be embedded and can be used to create interactive forms. It provides a means to create structured documents by denoting structural semantics for text such as headings, paragraphs, lists, links, quotes and other items. It can embed scripts written in languages such as JavaScript which affect the behavior of HTML web pages. The purpose of a web browser is to read HTML documents and compose them into visible or audible web pages. The HTML environment has a well known behavior, according to standards established by the World Wide Web Consortium (W3C) is the main international standards organization for the World Wide Web (abbreviated WWW or W3).

HTML5 introduced WebRTC application programming interfaces (APIs), that make it possible for applications that use JavaScript in an HTML5 environment to take part in real-time communications. To make use of this capability, applications that reside in the browser environment of one user need to exchange messages with another application to establish media connections. However, the signaling process of exchanging and negotiating session information is not specified by W3C and is left to the application to implement. The problem is more complicated if it is desired to make a connection with a non-browser media endpoint like a traditional telephony equipment.

It would be desirable to provide access to the network services available in the IP Multimedia Subsystem (IMS) from the HTML environment, and in particular, the HTML environments capable of real-time communication, for example HTML5. However extending IMS architecture to the HTML environment is difficult owing to incompatibility of SIP with HTTP over TCP/IP and the requirement for domain expertise to overcome such incompatibility. There is presently no simple way to extend the network services of the IP Multimedia Subsystem (IMS) to HTML5 applications without radical changes to the IMS model and custom extensions to the HTML platform to permit a browser to be used as an endpoint for IMS services. Thus, despite the desire to extend the enhanced capabilities that IMS provides to the HTML environment, such integration has not been readily feasible.

It would therefore be desirable to provide a system and method for extending IMS architecture to the HTML environment which is effective and simple to implement.

It would further be desirable to provide a system and method for extending IMS architecture to the HTML environment without radical changes to the IMS model or custom extensions to the HTML platform.

It would further be desirable to provide a system and method for extending IMS architecture to the HTML environment which can be implemented without domain expertise.

SUMMARY

The present invention provides a protocol component of system and method for extending IMS architecture to the HTML environment which overcomes the limitations of the state of the art.

The present invention provides a protocol component of system and method for extending IMS architecture to the HTML environment which is effective and simple to implement.

The present invention provides a protocol component of a system and method for extending IMS architecture to the HTML environment without radical changes to the IMS model or custom extensions to the HTML platform.

The present invention provides a protocol component of a system and method for extending IMS architecture to the HTML environment which can be implemented without domain expertise.

In an embodiment, the protocol component of the present invention provides a protocol for use in a communication channel between an HTML-capable application or operating system and the IMS core of a telecommunications network. The protocol helps overcome the need for domain expertise of complex SIP and other communications centric protocols. The protocol is part of a mechanism to combine complex signaling in the IMS telecommunications network into simple operations towards the Web. The protocol of the present invention thereby contributes to a platform which enables telecommunications providers to provide a better end-to-end customer experience accessible from a wide variety of HTML-capable consumer devices.

In an embodiment, the protocol of the present invention is used for communicating between a client-side controller and a network-side controller. The client-side controller provides client-side, native operating system application programming interfaces (API) and JavaScript APIs to interface with the HTML-capable application or operating system and encapsulate the HTTP signaling layer. The network-side controller terminates the communications with the client-side, and parses and normalizes the communications into an internal protocol suitable for communication with IMS within legacy telecommunications network systems (for example XMPP, SIP, and the like). The communications protocol provides a communication channel which is compatible with transmission over the Internet domain. The protocol thus facilitates creation of a dedicated "signaling" channel for all the applications on the client to interact with the IMS of telecommunications network services.

In a particular embodiment, the protocol of the present invention provides part of a system and method for exchanging signaling messages between HTML5 applications and a network-side controller, for example Oracle™ WebRTC Session Controller (WSC). The protocol is based in part on JavaScript Object Notation (JSON) and, thus, leverages JSON objects commonly used by HTML5 applications to specify a message format, data exchange protocol, and reliability protocol. The protocol utilizes WebSocket and the protocol can be used on multiple transports (COMET, BOSH, and WebSocket). The JSON-based protocol, which can be called a JSONrtc protocol, can be used by a network-side controller to mediate real-time communications between HTML5 applications and non-HTML5 endpoints. The protocol and message format is friendly for conversion to other protocols used by non-HTML5 environments, thus enabling the signaling sever to mediate between an HTML5 application and a non-HTML5 endpoint, e.g., traditional telephony equipment.

Other objects and advantages of the present invention will become apparent to those skilled in the art from the following detailed description of the various embodiments, when read in light of the accompanying drawings.

BRIEF DESCRIPTION OF THE DRAWINGS

FIG. 1C shows a sequence diagram for message exchange using the protocol of FIG. 1B according to an embodiment of the invention.

DETAILED DESCRIPTION

Figure 1A:
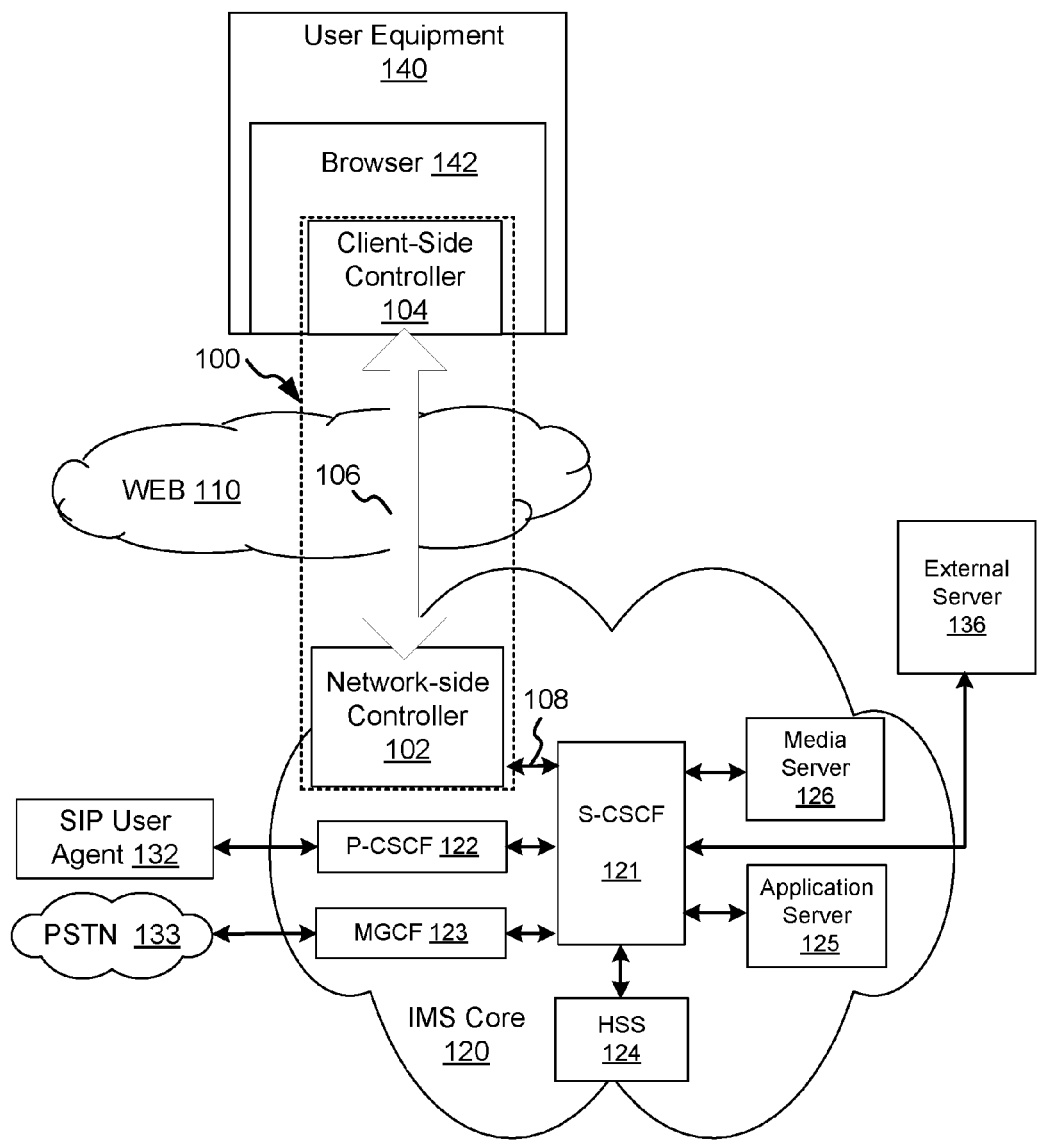
FIG. 1A shows an overview of a system for extending IP Multimedia Subsystem to HTML environments according to an embodiment of the present invention.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

The protocol of the present invention provides part of a system and method for transmitting signaling messages to and from HTML5 applications. The protocol utilizes JavaScript Object Notation (JSON) and, thus, leverages JSON objects commonly used by HTML5 applications, to specify a message format, data exchange protocol, and reliability protocol. The protocol also utilizes WebSocket and the protocol can be used on multiple transports (COMET, BOSH, and WebSocket). The JSON-based protocol can be used by a network-side controller to mediate between HTML5 applications and non-HTML5 endpoints. The protocol and message format is friendly for conversion to other protocols used by non-HTML5 environments, thus enabling the signaling sever to mediate between an HTML5 application and a non-HTML5 endpoint, e.g., traditional telephony equipment.

JavaScript Object Notation (JSON) is a text-based open standard designed for human-readable data interchange. It is derived from the JavaScript scripting language for representing simple data structures and associative arrays, called objects. The JSON format is described in RFC 4627. The JSON format can be used for serializing and transmitting structured data over a network connection, e.g. between a server and web application. The protocol of the present invention thus facilitates the integration of protocol functionality in Web applications by making use of JSON. Additionally, the protocol is designed to facilitate translation into other protocols, such as SIP. Accordingly, Web developers can access telecom functionality from a Web application without having expertise in telecommunications protocols such as SIP. The protocol can also be used between HTML5 endpoints.

FIG. 1A shows an overview of the system and method for extending IP Multimedia Subsystem to HTML environments according to an embodiment of the present invention. As shown in FIG. 1A, the system and method of the present invention 100, comprises a client-side controller 104, a network-side controller 102, and a communications protocol 106 for communicating between the client-side controller 104 and the network-side controller 102. The client-side controller 104 operating on User equipment 140, provides client-side and JavaScript APIs to encapsulate the HTTP signaling layer. The network-side controller 102 terminates the Internet domain communications with the client-side, and parses and normalizes the Internet domain communications into an internal protocol 108 suitable for communicating with elements of the IMS Core 120 within legacy telecommunications network systems (for example XMPP, SIP, and the like). The communications protocol 106 provides a communication channel which is compatible with communications over the Internet domain 110. The system and method thereby provides a dedicated "signaling" channel for the HTML-capable applications/operating system on the User Equipment 140 to interact with the IMS Core 120 of the telecommunications network.

In an embodiment of the present invention, the communications protocol 106 is used for communicating between a client-side controller 104 and network-side controller 102. The client-side controller provides a client-side JavaScript API to interface with the HTML-capable application or operating system (e.g. Browser 142) and encapsulates the HTTP signaling layer. The network-side controller 102 terminates the communications with the client-side over protocol 106, and parses and normalizes the communications into an internal protocol 108 suitable for communication with IMS within legacy telecommunications network systems (for example XMPP, SIP, and the like). The communications protocol 106 provides a communication channel which is compatible with transmission over the Internet domain 110. The protocol 106 thus facilitates creation of a dedicated "signaling" channel for all the applications on the user equipment 140 to interact with the IMS Core 120 of telecommunications network services.

In an embodiment of the invention, the protocol 106 is also applicable to pure web applications. For example, the protocol 106 is suited for communicating in a browser-webapplication-browser scenario. In this case, a webserver (e.g., Apache) can implement the protocol so that the browser applications can use it.

An embodiment of the invention exposes a protocol 106 that makes use of JavaScript Object Notation (JSON) objects that are commonly used by HTML5 applications. The protocol 106 specifies a message format, data exchange protocol, and reliability protocol which are expressed using such JSON objects. The protocol 106 makes use of features of WebSocket protocol and can be defined as a WebSocket subprotocol. In an alternative embodiment, the protocol can be defined as a WebSocket extension to leverage the extension properties of WebSocket (e.g. the opcodes, extension data, reserved bits etc.) however this would require cooperation by W3C and IETF working groups).

The protocol 106 provides for messages to be sent back and forth between the HTML5 application 142 and the network-side controller 102 over a WebSocket connection. It is expected that authentication would happen at the time of establishment of the WebSocket connection using a prominent Web authentication scheme. A web identity established by such a procedure will be mapped by the gateway or server with the network backend in an appropriate way unrelated to protocol 106. The network-side controller 102 can use these messages for exchanging the media information between the HTML5 application instances 142 and non-HTML endpoints in IMS CORE 120. The protocol 106 and message format is readily convertible to other protocols (such as internal protocol 108) used by non-HTML5 environments. One such protocol is Session Initiation Protocol (SIP), which can be used to connect traditional telephony equipment endpoints in IMS Core 120. The protocol 106 has the following advantages: 1. It enables connectivity with non-HTML5 endpoints; 2. It enables signaling between HTML5 endpoints; and 3. Since the protocol 106 is based on JSON, it is very easy to integrate with HTML5 applications.

User equipment 140 represents any HTML-capable device, including for example computing devices such as personal computers, laptops, desktops, notebooks, netbooks, tablets, mobile phones, and e-book readers. Moreover, HTML capabilities are being added to consumer devices, such as appliances, automobiles, set-top boxes, amplifiers, audio-visual components, televisions, projectors, and the like. HTML capabilities may be provided by a browser, for example, Safari, Firefox, Chrome Browser, Internet Explorer. Alternatively, HTML capabilities may be a core component of the operating system, for example Chrome OS.

IMS Core 120 (IP Multimedia Subsystem or IP Multimedia Core Network Subsystem) is an architectural framework for delivering IP multimedia services. As shown in FIG. 1A IMS Core 120 comprises: S-CSCF 121; P-CSCF 122; MGCF 123; HSS 124; Application Server 125; and Media Server 126. These elements are shown as an example of conventional IMS architecture. IMS Core 120 may contain additional and/ or different elements depending upon the implementation of a particular network. The present invention is not limited to any particular implementation of IMS Core 120. Indeed, it is a feature of the present invention that it extends whatever features are present in IMS Core to the Internet domain.

To ease the integration with the Internet, IMS uses IETF protocols wherever possible, e.g., Session Initiation Protocol (SIP). IMS Core 120 include network elements designed to interact with SIP User Agents 132 and PSTN 133. As used herein, a user agent is an SIP endpoint that can be considered anything that either originates or terminates a SIP session, e.g., SIP Phones, Soft Phones, and the like. Typically such devices must be specifically designed to implement SIP in order to function as SIP User Agents 132. In addition the IMS Core 120 can exchange signaling and media messages with a public switched telephone network (PSTN) 133. IMS Core 120 facilitates access to multimedia and voice applications from wireless and wireline terminals to create a form of fixed-mobile convergence (FMC). This is done by having a horizontal control layer that isolates the access network from the service layer. From a logical architecture perspective, services need not have their own control functions, as the control layer is a common horizontal layer.

Referring again to the IMS Core 120 shown in FIG. 1A, P-CSCF 122, represents the proxy call session control function which is an entry point for a SIP user agent 132, and authenticates users and establishes IP security integration with the SIP user agent 132. Media gateway controller function (MGCF) 123 is the entry point for signaling and media messages transmitted via public switched telephone network (PSTN) 114. MGCF 123 and P-CSCF 123 are used to process ingoing and outgoing SIP signaling packets in the IMS Core 120. On the network-side, MGCF 123 and P-CSCF 122 interact with S-CSCF 121 using Session Initiation Protocol (SIP).

S-CSCF 121 is the central node of the signaling plane. It is a SIP server, but also performs session control. S-CSCF 121 is located in the home network. It uses Diameter Cx and Dx interfaces to the Home Subscriber Server (HSS) 124 to download user profiles and upload user-to-S-CSCF associations. All necessary subscriber profile information is loaded from the HSS 124. S-CSCF 121 inspects every message from the SIP user agent 132 and/or other network elements, and decides where the SIP message should be forwarded for service provision. An Application Server AS 125 hosts and executes services, and interfaces with the S-CSCF 121 using SIP. Additionally a media server 126 provides media related functions such as media manipulation, e.g. voice stream mixing and interfaces with the S-CSCF 121 using SIP. S-CSCF 121 may also allow for provisioning of services and/or media services from an external server 136.

As described above, the elements of IMS Core 120 communicate with the central node of the signaling plane S-CSCF 121 using Session Initiation Protocol (SIP) (alternative session oriented protocols may also be used, including for example XMPP). However SIP is not easily compatible with conventional protocols for transmission over the Web 110. Integration of IMS Core 120 is therefore difficult owing to incompatibility of protocols used in the two different environments and the requirement for domain expertise to overcome such incompatibility. The present invention provides a solution to such problems and therefore allows for extending the IMS Core 120 to the Web 110.

Network-side controller 102 is an entry point for HTTP traffic from Web 110. Network-side controller 102 terminates Internet domain communications with the client-side, and parses and normalizes the Internet domain communications into an internal protocol 108 suitable for communicating with elements of the IMS Core 120 (e.g. S-CSCF 121) within legacy telecommunications network systems (for example XMPP, SIP, and the like). Network-side controller 102 communicates with client-side controller using a protocol 106 adapted to meet the real-time signally requirements of SIP while remaining compatible with transmission over Web 110. The client-side controller 104 operating on User equipment 140, provides a client-side JavaScript API to interface with HTML-capable applications/operating systems and encapsulate the HTTP signaling layer. The system and method 100 thereby provides a dedicated "signaling" channel for all the HTML-capable applications/OS on the User Equipment 140 to interact with the IMS Core 120 of the telecommunications network.

From an IMS network perspective, network-side controller 102 sits in the edge of IMS core 120 and is architecturally parallel to a P-CSCF. While P-CSCF is the entry point (many times along with a Session Border Controller) for the SIP endpoints, network-side controller 102 serves as the entry point for HTML5 endpoints. Thus, network-side controller 102 has the ability to leverage applications in the IMS application server 125 instead of hosting a separate/custom business application on its own thus greatly simplifying integration with IMS Core 120. For example, for a conference server, the network-side controller 102 would intelligently hand the requests to a backend IMS application server 125. The conference application would then route the requests to an appropriate media mixer and run the conference.

Figure 1B:
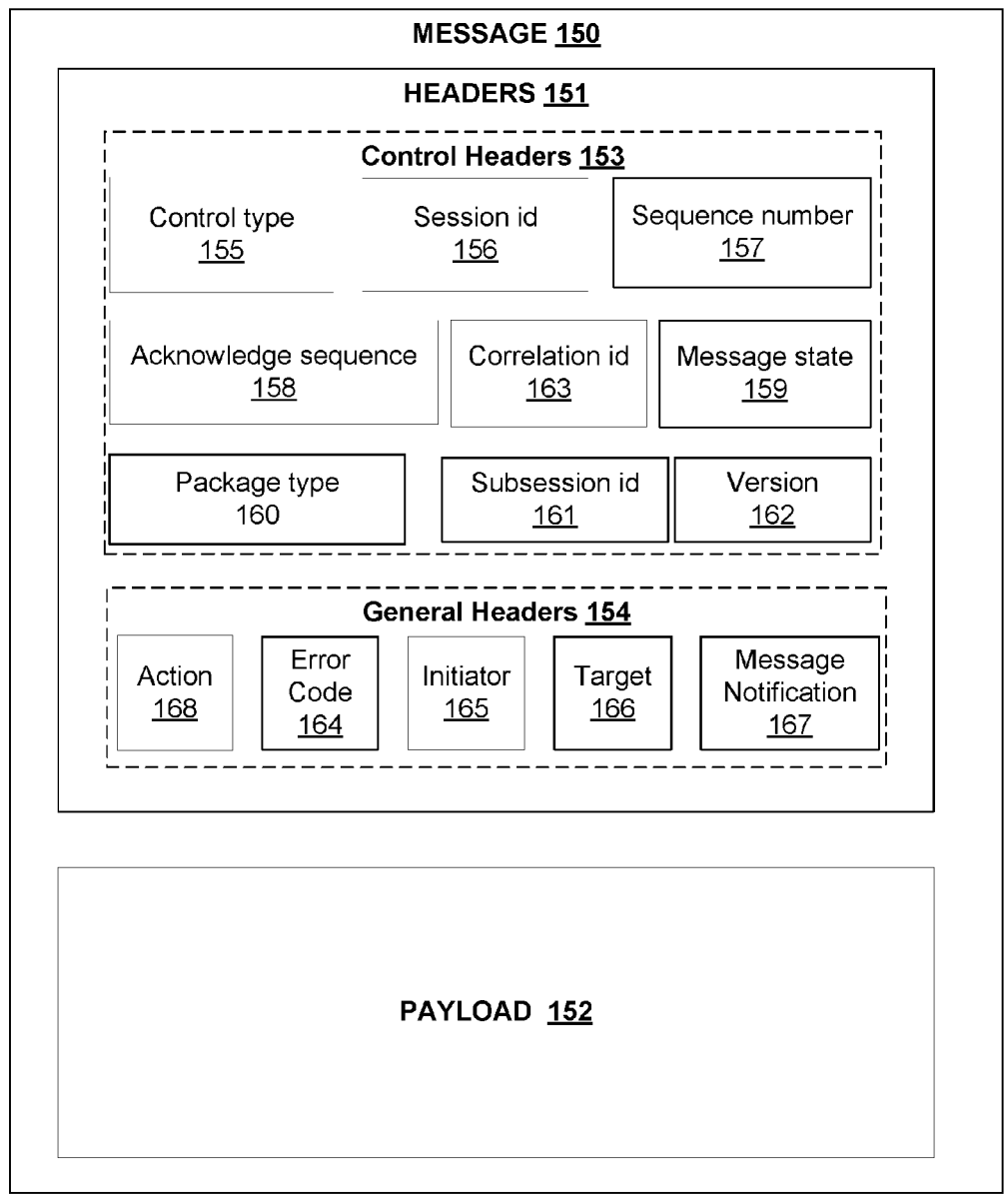
FIG. 1B shows a diagram representing a protocol component of the system for extending IP Multimedia Subsystem to HTML environments of FIG. 1A according to an embodiment of the invention.

In a particular embodiment, described in more detail with respect to FIGS. 1B, and 1C, the protocol 106 of the present invention provides part of a system and method 100 for exchanging signaling messages between HTML5 applications (e.g. Browser 142) and a network-side controller 102, for example Oracle™ WebTRC Session Controller (WSC). The protocol 106 can also be used for communications between HTML5 endpoints. The protocol 106 comprises JavaScript Object Notation (JSON) format messages and, thus, leverages JSON objects commonly used by HTML5 applications (e.g. Browser 142) to specify a message format, data exchange protocol, and reliability protocol. The protocol 106 utilizes WebSocket and the protocol 106 can be used on multiple transports (COMET, BOSH, and WebSocket). The JSON format protocol 106 can be used by a network-side controller 102 to mediate between HTML5 applications (e.g. Browser 142) and non-HTML5 endpoints (e.g. IMS Core 120). The protocol facilitates communication of media offers and answers to enable WebRTC and can be referred to as a JSONrtc protocol. The protocol 106 and message format are also friendly for conversion to other protocols (e.g. internal protocol 108) used by non-HTML5 environments (e.g. IMS Core 120), thus enabling the network-side controller 102 to mediate between an HTML5 application and a non-HTML5 endpoint, e.g., traditional telephony equipment.

Protocol 106 defines a data exchange format for communication between and HTML5 Application and a server or other HTML5 endpoints. At a top level, data format defines a set of control headers, a set of general headers and a payload. The control headers primarily relate to operation of the communication channel whereas the general headers relate to the communication. In communication with a network-side controller, the control headers are primarily useful to actions of the networks-side controller itself whereas the general headers are useful for conversion to a downstream protocol e.g. SIP. The two layers of headers thereby simplify communication with the network-side controller as well as simplifying implementation by a web developer.

FIG. 1B shows a diagram representing the protocol component of the system for extending IP Multimedia Subsystem to HTML environments of FIG. 1A according to an embodiment of the invention. The protocol and message format are friendly for conversion to other protocols used by non-HTML5 environments, thus enabling the network-side controller 102 to mediate between an HTML5 application (e.g. Browser 142) and a non-HTML5 endpoint, e.g., a traditional telephony equipment (IMS Core 120). Thus, the network-side controller 102 can receive a JSON message in the protocol 106, parse the SDP information and map it to other protocols 108 (SIP/XMPP) supported by the IMS Core 120 of traditional telephony equipment. The network-side controller 102 can maintain a data definition for the format to parse to.

As illustrated in FIG. 1B, a frame or message 150 in the protocol 106 can contain a headers section 151 and a payload section 152. The headers section 151 includes a control headers section 153 and a general headers section 154.

The payload section 152 is specific to the package being used. A package is the type of service or functionality that the message handles. The defined packages for this protocol are call, presence and message notification. For example, the payload for the call package will be an SDP (offer or answer), and the payload for the message notification package can be a JSON data with exact message alerts. Similarly a presence package would expect the payload to be the presence information.

The control headers section 153 contains the information related to the semantics of the protocol, e.g., information required for WebSocket re-connect, reliability, timeouts, error etc. It also contains the state of the message, type of the message etc. In an embodiment of the invention, the control headers section 153 can include the following fields: control type 155, session Id 156, sequence number 157, acknowledge sequence 158, message state 159, a package type 160, a subsession Id 161, version 162, and correlation id 163. The fields comprise attribute-value pairs information related to the semantics of the protocol. TABLE I shows the control headers 153 of the protocol.

TABLE I

| Attribute | Value | Function |
| --- | --- | --- |
| Type (t) | | Control type of the JSON message. Three control types (r, rs and m) may have a payload, whereas the others (a and e) do not. |
| Type (t) | Request (r) | A message that require a response. An example is an offer message. |
| Type (t) | Response (rs) | A response to a request. Example, Answer. |
| Type (t) | Message (m) | A message that does not require a response. Example, Notification, publish etc. |
| Type (t) | Acknowledge (a) | An acknowledgement of a message. |
| Type (t) | Error (e): | A message indicating an error in one of the messages the other party sent. |
| package_type (p) | "call" "presence" "message_notification" | The package is the type of service or functionality, that the message handles. If no package is specified, "call" package is assumed for all messages except CONNECT action. |
| session_id (sid) | Session identifier. | Uniquely identifies a session(e.g., WebSocket session), that the client establishes with the server. |
| subsession_id (ssid) | | Identifies a particular subsession within the session. |
| correlation_id (ci) | | Associates the current message with a prior message. E.g. a response with a request. |
| Sequence (s) | Sequence number is a serial number that starts with 1. | Sequence number uniquely identifies a message within the session. Each side of the WebSocket connection uses their own series of numbers. |
| ack_sequence (as) | Serial number. | Optional. ack_sequence identifies a particular message within a session. This header can appear in both client and sever messages. It is used to confirm receipt of the identified message. |
| message_state (ms) | "Subsequent" "Final" | Identifies whether the message is Initial, Subsequent or Final. An answer can be an initial answer, subsequent answer or a final answer. The state of "Initial" is implied for any message. When there is a subsequent or final message, the message_state is specified. |
| Version (v) | 1.0 | Indicate the protocol version client or server supports. The version of the protocol defined in this document is "1.0". In case version is absent, it is defaulted to be "1.0". |

The control type 155 defines the types of the message, which can be request, response, message acknowledgement, or error. A request control type indicates that the message requires a response, and a response control type indicates the message is a response to a request. In an embodiment of the invention, the control types of request, response and message can include a payload 152.

Requests, responses and messages can carry a payload between the client and a server. An advantage of messages is that they do not necessitate a response. The protocol has its own reliability model to ensure message delivery as explained below. Thus messages can be used to avoid request/response overhead. This simplifies coding of the communication for the Web developer as the developer does not need to code the request/response functionality but can instead rely on the reliability model to ensure message delivery.

In an embodiment of the invention, a message state field 159 specifies if a message is Initial, Subsequent or Final. For example, an answer can be an initial answer, subsequent answer, or a final answer. The state of "Initial" is implied for any message and the state for a subsequent or final message needs to be explicitly specified.

Package type 160 indicates the type of service or functionality that the message handles, e.g., call and presence. If no package type is specified, a call package is assumed for all messages except messages with a CONNECT action.

The protocol 106 provides for both a Session ID and a Subsession ID. Session ID 156 identifies a WebSocket session that the client establishes with the server. The Session ID is unique across time and space. This helps Session ID to remain unique across geographically redundant clusters and also withstand node/geography failures. A subsession ID 161 can be used to identify a particular subsession within a WebSocket session. In an embodiment of the invention, the Subsession ID is the sequence number 157 of the message that establishes the subsession, with a prefix "c" or "s" denoting the direction of the referenced message, where "c" indicates that the referenced message is originated from the client, and "s" indicates that the referenced message is originated from the server (network-side controller).

The protocol provides for a unique sequence number for each message of a session (WebSocket connection). The sequence number 157 is a serial message number that starts with 1 at the beginning of the session and increments with each message. Each side of the WebSocket connection has their own series of sequence numbers. A sequence number uniquely identifies each message within a session. An acknowledge sequence number 158 acknowledges receipt of all messages up to and including the specified sequence number within the session. This header, can appear in both client and sever messages.

Correlation ID 163 can be used to associate a message with a prior message. For example, a correlation ID can associate a response message with the related request message. The sequence numbers provide a protocol reliability model. The correlation id is a number prefixed with "c" or "s" denoting the direction of the referenced message; "c" indicating that the reference message originated from the client; and "s" indicating that the reference message originated from the server.

The sequence number along with acknowledgement sequence numbers, error messages and retransmission ensure that messages are reliably exchanged between HTML5 applications and the network-side controller (or HTML5 endpoints). The acknowledgement messages and error messages are applicable to requests, responses and messages. An acknowledgement message can be identified by the "message acknowledgement" control type in the control headers section. It is an acknowledgement that a message and all the messages with a lower sequence number have been successfully delivered. In an embodiment of the invention, the protocol allows an HTML5 application to be configured to send an acknowledgement message for every message. If one side receives an acknowledgement message with a sequence number higher than that of a particular sent message, and does not receive an error message for the particular message, it can be assumed that the particular message has been successfully delivered. In an embodiment of the invention, an error message indicates that a message with the specified sequence number has encountered an error.

The protocol utilizes a WebSocket connection and retransmissions of messages are not required, except when the connections are broken and need to be re-synched. The connection recovery can follow the semantics explained in the MBWS specification. The protocol also depends on the WebSocket ping/pong to support keepalive, and the failure of one side to receive the keepalive would result in timeout of the last request/response/message. In a scenario where the WebSocket ping/pong is not supported by the browser, the client-side controller can initiate a custom ping/pong with the network-side controller. When the browser/client-side controller determines that it is not receiving pong from the server any more, it continues to send the ping messages for a stipulated period of time at intervals which double at each attempt.

The general headers section 154 contains information related to the specific action involved in the message. For example, for a START request, the general headers section can identify who has initiated the request, for whom the request is intended etc. In an embodiment of the invention, the general headers 154 include the following fields: action 168, an initiator 165, a target 166, error code 164, and message notification header 167. The fields comprise attribute-value pairs information related to the semantics of the protocol. An HTML5 application can also add additional headers to this section in the form of additional AVPs (attribute-value pairs). Such additional AVPs may be mapped by a gateway server, e.g., network-side controller/WSE, to a SIP header or a parameter. TABLE II shows the general headers 154 of the protocol.

TABLE II

| Attribute | Value | Function |
|---|---|---|
| Action (a) | | This is the action which the message is used for. |
| Action (a) | CONNECT | Establishes a protocol level session with the server. |
| Action (a) | START | Message that start a session with a particular package. |
| Action (a) | COMPLETE | Informs the completion of media establishment. |
| Action (a) | NOTIFY | Equivalent to Notification of Notification Server. |
| Action (a) | SHUTDOWN | Shutdown a session started by a particular request message. |
| Initiator (i) | alice@example.com | Optional. Identifies the user who initiated a request. Note that, while it is possible for the client to set this value, it is also possible that this value may come from the HTTP session. In certain cases, |

TABLE II-continued

| Attribute | Value | Function |
|---|---|---|
| | | such a value may not even exist (eg: a random user clicking on the web page to talk with customer care). |
| Target | (t) | Optional: Again, this may be obtained from HTTP session. |
| error_code | (ec) | Optional: This is the error code of the message, only apply to error type message. |
| CONNECT, cslr | (cslr) | Optional: This header is used when a CONNECT message is sent with an existing session_id to re-establish the session. The value of this header will be the sequence number of the last received message at the client. |
| CONNECT, cslw | (cslw) | Optional: This header is used when a CONNECT message is sent with an existing session_id to re-establish the session. The value of this header will be the lower bound of the messages in the client's retained window. |
| CONNECT, csuw | (csuw) | Optional: This header is used when a CONNECT message is sent with an existing session_id to re-establish the session. The value of this header will be the upper bound of the messages in the client's retained window. |
| CONNECT, sslr | (sslr) | Optional: This header is used when a CONNECT message is sent with an existing session_id to re-establish the session. It is the sequence number of the message the server last received. |
| message-notification, expiry | (xp) | Optional: This header represents expiry time of the subscription for receiving message-summary notifications. |

The action field 168 indicates an action which the message is used for. For example, the action CONNECT establishes a protocol level session with the server; the action START indicates that the message is used for starting a session with a particular package. The optional initiator 165 indicates the user, e.g., alice@example.com, who initiated a request. In an embodiment of the invention, while the client can set this value, this value may come from the HTTP session. In certain cases, such a value may not even exist. For example, when a random user clicks on the web page to talk with a customer service representative. The optional target field 166 can be used to indicate a remote peer. The optional error code field 164 can be used to transmit an error code.

A client requests a connection reconnect by sending a Connect frame containing the session_id of the connection to be reconnected followed by a list of three message sequence numbers. The first sequence number (CSLR) is that of the last message the client has received. The second (CSLW) and third (CSUW) sequence numbers define the respective lower and upper bounds of the sequence numbers of the messages in the client's retained message window. Upon receipt of this Connect frame, the server determines if it can reconnect based on the following criteria: The session_id must match the client's current session_id; CSLR+1 must be the sequence number of a message the server can reinitiate sending with (i.e. either the message with this sequence number is in the connection's retained message window or it is the sequence number of the next unsent message); and the message sequence number of the message the server last received (SSLR) is in the range of CSLW−1 to CSUW. If all three criteria are met the reconnect succeeds and the server responds with a Connect frame containing the reconnected session_id and one sequence number (SSLR) which is that of the last message received by the server. Message transport then resumes with the client sending the SSLR+1 message and the server sending the CSLR+1 message. If the criteria are not met, the reconnect request fails and the server treats it as though it were a connect request and responds with a connect response. The client recognizes that its reconnect request has been converted into a connect request because the response contains a session_id that does not match the session_id in the client's reconnect request.

In an embodiment of the invention, the general headers section 154 can include more optional fields, such as action specific fields and package specific fields. An example of an action specific field can be a field used when a CONNECT message is sent with an existing session ID to re-establish the session. The value of this field can be the sequence number of the last received message at the client. An example of the package specific headers can be a header that represents expiry time of the subscription for message-summary notifications.

In an embodiment of the invention, an example a message in protocol 106 can be as follows:

```
START
{
    "control": {
        "type":"request",
        "message-state":"initial"
    },
    "header": {
        "message-type":"start",
        "initator":"bob@example.com",
        "target":"alice@example.com",
    },
```

-continued

```
    "payload": {
    "<offer-sdp>"
    }
}
```

The network-side controller/WSE can provide the ability to extend the protocol by adding depth and applicability to a set of existing methods. New headers, e.g., security header and capabilities header, can be added to the control headers section and the general headers section of a message. New control types and message types can also be added, e.g., UPDATE, and the protocol extensions shall follow the semantics of the core protocol (control and general headers).

In order to facilitate extensibility, JSON templates can be provided to facilitate the protocol extension. For example, JSON templates can allow a client to program towards abstract data and service models rather than directly to JSON specified structure/definitions. In an embodiment of the invention, templates can be provided for message-types (CONNECT, START, NOTIFY) and create a new message-type by providing a message name and the required header parameters in the templates. The template can create a new message-type based on the parameters passed. The templates may be provided, for example, by the network side controller/WSE.

FIG. 1C shows an example of sequence diagram for transmission of messages using the protocol 106 of FIG. 1B between Browser 142 (implementing client-side controller 102) and SIP Endpoint 191 via S-CSCF 121 (a non-HTML endpoint in IMS Core 120) mediated by Network-side Controller 104 according to an embodiment of the invention. The sequence diagram shows an example flow of messages mapped from the JSONrtc protocol to SIP. Note that SIP communications 190 between S-CSCF and SIP Endpoint are not shown because they are conventional SIP communications.

As shown in FIG. 1C, initially a WebSocket connection is established 170 between Browser 142/Client-side Controller 102 and Network-side Controller 104. The client browser 142 is authenticated using typical authentication mechanisms, and a handshake mechanism is used to establish the WebSocket connection with the Network-side Controller 104. It is expected that authentication would happen at the time of establishment of the WebSocket connection using a prominent Web authentication scheme. A web identity established by such a procedure will be mapped by the gateway or server with the network backend in an appropriate way unrelated to protocol 106. As an option it is possible to direct the client-side controller to an authentication endpoint by sending an appropriate response to a connection request.

At step 171, Browser 142 sends a Connect request to Network-side Controller 104 using JSONrtc protocol. The Network-side Controller 104 maps the CONNECT message to SIP:REGISTER, and transmits the Register request to S-CSCF 121 using SIP at step 172. Network-side Controller 104 then waits for the response from S-CSCF 121. S-CSCF 121 is a standard SIP element that can forward the SIP:REGISTER to one or more SIP endpoints 188 within IMS Core 120, e.g., a traditional telephony equipment. After forwarding the SIP:REGISTER to the desired endpoint and receiving a response, at step 173, S-CSCF 121 sends an OK response to Network-side Controller 104. At step 174, Network-side Controller 104 maps the SIP OK message to a JSONrtc response to the CONNECT message and transmits the response to Browser 142.

After receiving the CONNECT response, Browser 142 sends a START message to Network-side Controller 104 using JSONrtc. The Network-side Controller 104 maps the START message to SIP:INVITE, and transmits the INVITE request to S-CSCF 121 using SIP at step 176. Network-side Controller 104 then waits for the response from S-CSCF 121. After forwarding the INVITE request to the desired endpoint 188, S-CSCF 121 waits for a response. While waiting, S-CSCF 121 sends provisional SIP responses at steps 177 and 178. 100/TRYING indicates an extended search is being performed. 180/TRYING indicates that the destination endpoint 188 has received the INVITE. At step 179, Network-side Controller 104 sends an initial response message to Browser 142. At step 180, having received an affirmative response to the INVITE request from the SIP endpoint 188, S-CSCF 121 sends a 200/OK response to Network-side Controller 104. At step 181, Network-side Controller 104 maps the SIP OK message to a JSONrtc final response to the START message and transmits the final response message to Browser 142. At step 182, Browser 142 sends a COMPLETE message to Network-side Controller 104 using JSONrtc to indicate completion of the media establishment.

At step 183, upon receiving the COMPLETE message, Network-side Controller sends an ACK message to S-CSCF 121 using SIP. At step 184, SIP Endpoint 188 transmits a BYE request to S-CSCF 121 using SIP. The BYE request from the SIP endpoint to the Network-side Controller 104 would result in sending a SHUTDOWN action from the Network-side Controller 104 to the Browser 142 at step 185. At step 186, Network-side Controller 104 also sends a SIP:OK response to S-CSCF 121 for transmission to the SIP endpoint. In an embodiment of the invention, a SHUTDOWN request can be initiated by the Browser 142 to Network-side Controller 104 at step 186. At step 187, Network-side Controller 104 would send a BYE to S-CSCF 121, which then would respond with a 200/OK at step 188. Upon receiving the response from S-CSCF 121, Network-side Controller 104 would send an ACK to the Browser 142 at step 189.

Example Messages

The following examples illustrate how the protocol of the present invention may be utilized to perform certain functions.

```
CONNECT
{
    "control": {
        "type":"request",
        "sequence":"1",
        "version":"1.0"
    },
    "header": {
        "action":"connect",
        "initator":"bob@att.com",
    }
}
```

```
CONNECT without initiator
{
    "control": {
        "type":"request",
        "sequence":"1",
    },
    "header": {
        "action":"connect",
    }
}
```

```
CONNECT Response (without initiator)
{
  "control": {
    "type":"response",
    "sequence":"1",
    "correlation_id":"c1",
    "subsession_id":"c1",
    "session_id":"Hyi89JUThhjjR",
    "version":"1.0"
  },
  "header": {
    "action":"connect"
  }
}
```

```
START (With initiator/target)
{
  "control": {
    "type":"request",
    "sequence":"2",
  },
  "header": {
    "action":"start",
    "initator":"bob@att.com",
    "target":"alice@att.com",
  },
  "payload": {
    "<offer_sdp>"
  }
}
```

```
START (Without initiator/target)
{
  "control": {
    "type":"request",
    "sequence":"2"
  },
  "header": {
    "action":"start"
  },
  "payload": {
    "<offer_sdp>"
  }
}
```

```
Response to START (Without initiator/target)
{
  "control": {
    "type":"response"
    "sequence":"2",
    "correlation_id":"c2"
    "subsession_id":"c2"
  },
  "header": {
    "action":"start"
  },
  "payload": {
    "<pranswer_sdp>"
  }
}
```

```
Response to START (With initiator/target)
{
  "control": {
    "type":"response"
    "sequence":"2",
    "correlation_id":"c2"
    "subsession_id":"c2"
  },
```

```
  "header": {
    "action":"start"
    "initator":"bob@att.com",
    "target":"alice@att.com",
  },
  "payload": {
    "<answer_sdp>"
  }
}
```

```
START (Offer with changed media)
{
  "control": {
    "type":"request",
    "sequence":"3",
    "subsession_id":"c2"
  },
  "header": {
    "action":"start"
  },
  "payload": {
    "<offer_sdp>"
  }
}
```

```
SHUTDOWN
{
  "control": {
    "type":"request"
    "sequence":"4",
    "subsession_id":"c2"
  },
  "header": {
    "action":"shutdown"
  }
}
```

```
ACKNOWLEDGEMENT
{
  "control": {
    "type":"acknowledgement"
    "sequence":"5"
  }
}
```

```
Error
{
  "control": {
    "type":"error"
    "sequence":"6",
    "correlation_id":"c2"
    "subsession_id":"c2"
    "error_code":"480"
  }
}
```

Further details of one possible implementation of the system and method of the present invention 100 will now be described with respect to FIGS. 2A-2D, in which Network-side controller 102 is implemented as Oracle™ WebRTC Session Controller (WSC) 216, Client side controller 104 is implemented as RTC Client Signaling Controller 222, and protocol 106 is implemented in JavaScript Object Notation (JSON) over WebSocket.

Figure 2A:
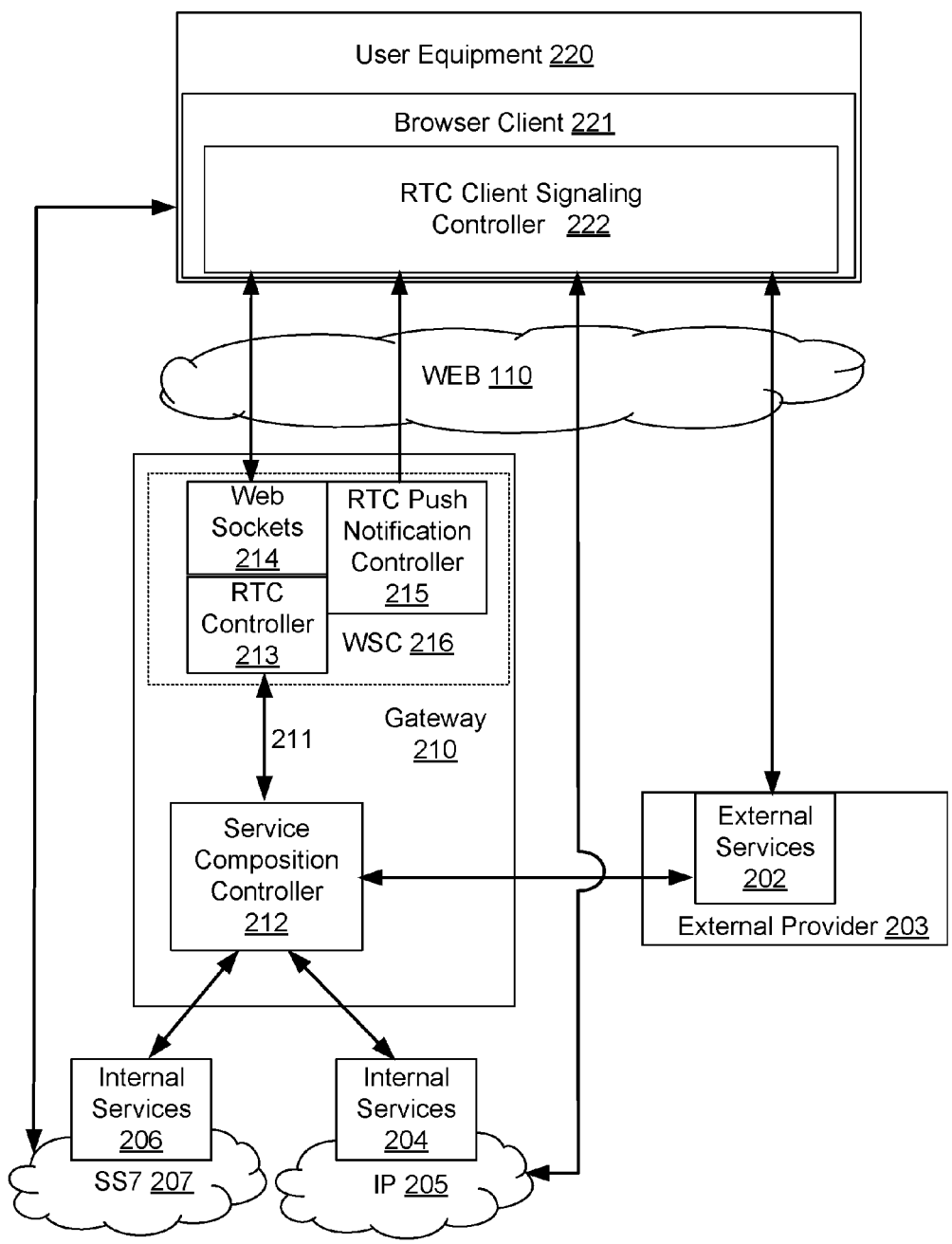
FIG. 2A shows a system for real-time communication signaling according to an embodiment of the present invention.

FIG. 2A shows a gateway 210 for real-time communication signaling according to an embodiment of the present invention. As shown in FIG. 2A, Gateway 210 includes RTC Controller 213, RTC Push Notification Controller 215, and Service Composition Controller 212. RTC Controller 213 and RTC Push Notification Controller 215 interact with RTC Client Signaling Controller 222 over the Web 110. RTC Controller 213 communicates internally 211 using SIP with Service Composition Controller 212. Service Composition Controller 212 mediates provision of Internal Services 206, 204 and External Services 202 of an External Provider 203. RTC Push Notification Controller 215, RTC Controller 213 and Web Sockets Interface 214 together comprise an embodiment of WSC 216.

RTC Controller 213 provides scalable signaling over HTTP web-centric protocols for communicating over Web 110 with RTC Client Signaling Controller 222. RTC Controller 213 communicates with RTC Client Signaling Controller 222 via web sockets interface 214. RTC Controller 213 provides a highly available, encapsulated front end interface to the web developer. The RTC Controller 213 terminates the Internet domain communications with the client-side by managing the web socket connections. The RTC Controller 213 also parses and processes the Internet domain communications. The RTC Controller 213 normalizes the Internet domain communications into an internal SIP for communication within Gateway 210. Thus, RTC Controller 213 communicates internally with Service Composition Controller 212 using a binary SIP.

Service Composition Controller 212 provides for service composition and orchestration across domains and different providers. The Service Composition Controller 212 also provides a unified layer to inject charging and policy control for differentiated service offerings. In an embodiment the functionality of Service Composition Controller 212 can be integrated in to a converged application server, for example Oracle™ Communications Converged Application Server (OCCAS). Alternatively, the functionality of Service Composition Controller 212 can be integrated in to a service controller, for example Oracle™ Communications Service Controller (OCSC).

Service Composition Controller 212 adopts and reuses existing internal communication services with support for different signaling protocols. Thus, for example, Service Composition Controller 212 can mediate: Internal Services 206 providing network telephony signaling using the SS7 protocol 207; and Internal Services 204 providing services using internet protocol 205.

Service Composition Controller 212 can also mediate the provision of external services 202 provided by an external service provider 203. Communication with external provider 203 can be conducted using a selected signaling protocol SIP, XMPP etc as required by the external provider 203. Services provided by external provider 203 can include web services provided over Web 110 to a browser client 221 on user equipment 220. Service Composition Controller 212 thus enables external providers of over-the-top ("OTT") services to provide OTT services to users/clients. The gateway system enables the external providers to make use of the real-time communication signaling over IMS. The users/clients can then access web applications provided by external providers from a browser on the user equipment.

The gateway system acts as the IMS proxy for both HTML5 and external providers by taking advantage of Web-Socket technology, to enable and expedite the IMS deployment. The WebSocket Protocol defines a mechanism for fast, secure, two-way communication between a client and a server over the Web. Data is transferred over a full-duplex single socket connection, allowing messages to be sent and received from both endpoints in real-time. To establish a WebSocket connection, a specific, HTTP-based handshake is exchanged between the client and the server. If successful, the application-layer protocol is "upgraded" from HTTP to WebSocket, using the previously established TCP transport layer connection. After the handshake, HTTP is no longer used and data can be sent or received using the WebSocket protocol by both endpoints until the WebSocket connection is closed.

RTC Client Signaling Controller 222 is resident on user equipment 220 and manages multiplexing of signaling request/response for all client-side applications mediating communication with RTC Controller 213 over HTTP web-centric protocols. The particular HTTP protocol used can be defined as required by the particular native or external service, for example, JSON, XML, XMPP, Skype protocol etc. A client-side library of available protocols is provided as part of an SDK in order to extend the services to the client.

For telephony applications low power consumption by user equipment 220 is desirable. Accordingly RTC Client Signaling Controller 222 can be placed in standby operation when not involved in signaling. Moreover web socket protocol must be initiated from the client-side and is also responsible for keeping the connection alive. Thus, the RTC Client Signaling Controller 222 will shut down the web socket connections when there is no traffic. RTC Push Notification Controller 215 can be used by RTC Controller 213 to "wake-up" RTC Client Signaling Controller 222 from the standby state in order to resume communication. The RTC Push Notification Controller 215 may, in some embodiments, also be used for other notifications such as call notifications, message notifications, and the like. In an alternative embodiment, as described above, the keepalive and pingpong capabilities of the WebSocket protocol may be used to maintain WebSocket connection.

RTC Push Notification Controller 215 includes a server-side HTTP connection based Push Notification to wake up the client-side signaling process. RTC Client Signaling Controller 222 can utilize any push notification mechanism and protocol effective for user equipment 220. For example, RTC Push Notification Controller 215 can utilize the SMS message system to activate RTC Client Signaling Controller 222, thereby causing RTC Client Signaling Controller 222 to reactivate the web sockets connection with the RTC Controller 213.

Figure 2B:
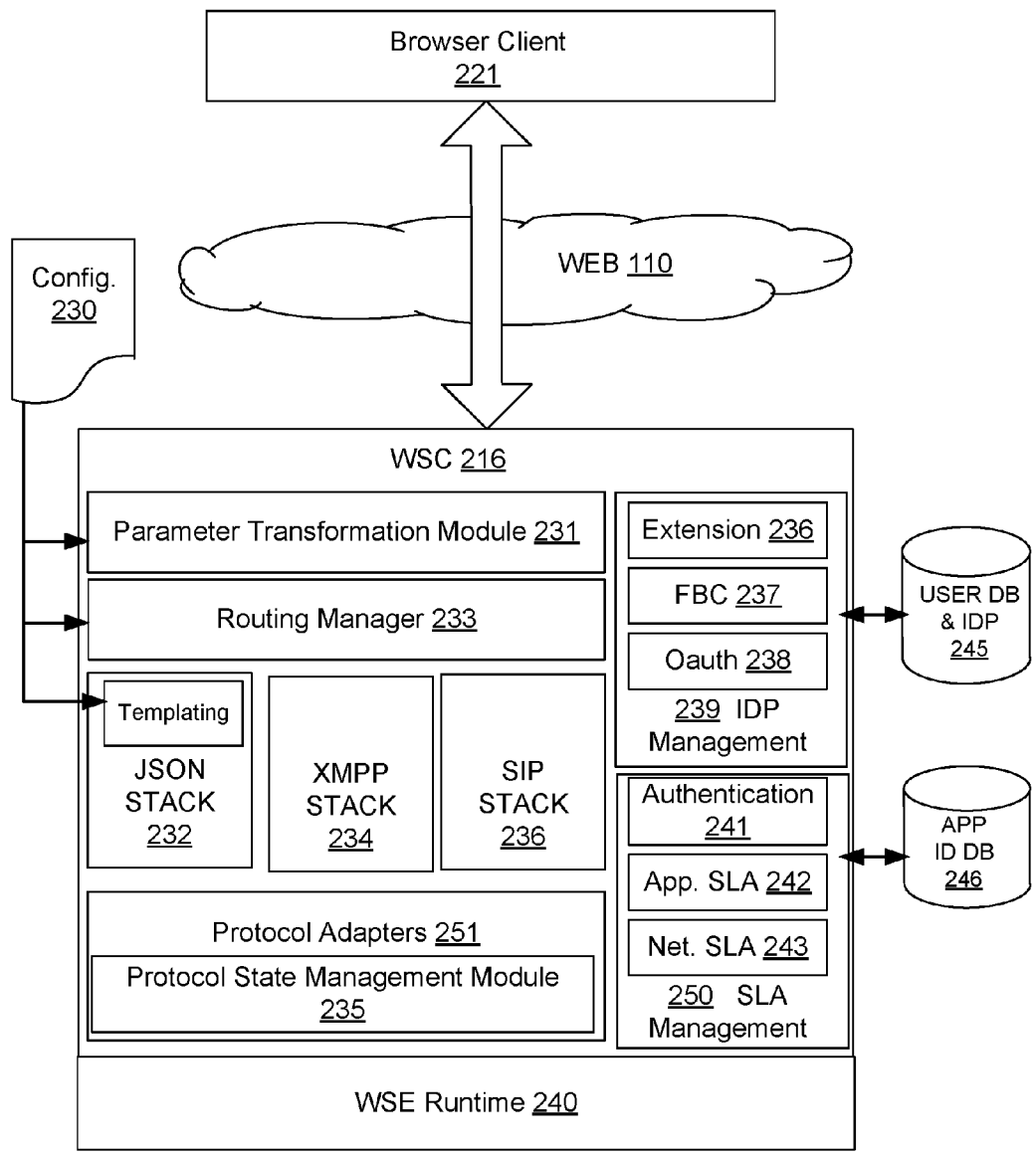
FIG. 2B shows a server-side WebRTC Session Controller according to an embodiment of the invention.

FIG. 2B shows an embodiment of server WSC 216 according to an embodiment of the invention. WSC 216 is deployed between the browser client 221 and the service composition controller 212 for exposing the internal and external services 206, 204, 202 to the client browser 221 (see FIG. 2A). WSC 216 enables the browser as a client for the network services and hence acts as a browser adapter. WSC 216 enables browser client management and ensures reliability of the service end to end (browser to network). WSC 216 provides a number of features to the carriers and enterprise customers as described below.

WSC 216 including WSE runtime module 240 supports multiple signaling protocols and ensures correct mapping of the signaling message using parameter transformation module 231 and correct routing of the messages based on routing profiles using routing manager 233. Parameter transformation, routing and JSON templating are all configurable using a configuration file 230.

WSC 216 performs protocol mapping between the selected client-side protocol and the network side protocol (SIP). For example, WSC 216 is adapted to receive a JSON message, parse the SDP information and map it to other supported protocols (SIP/XMPP). WSC 216 maintains a data definition for the format to parse to. When the JSON request is received at WSC 216, the transformation between the data definition and the JSON message structure must be implemented.

WSC 216 acts as a cross protocol signaling engine. WSC 216 handles the protocol associated state as demanded by the protocol. When WSC 216 is acting as a cross-protocol gateway, for example, JSON/WebSocket to SIP, the SIP side of WSC 216 maintains the transaction and dialog state. WSC 216 includes a protocol state management module 235 which manages the protocol state and ensures state replication for reliability of message exchange. WSC 216 has the ability to manage enormous amounts of concurrent client connections in order to be able to scale to the applications and users on the web.

For developers, the key is to leverage existing knowledge and skill sets to minimize additional time and resources required by security features implementation. WSC 216 comes with APIs that support multiple platforms running under multiple protocols and a set of client libraries to facilitate smooth development process. WSC 216, thus, additionally provides an extensibility framework to extend the capabilities via protocol adaptors 251 and APIs for the web developers to call the WSE functions from their applications.

WSC 216 provides signaling adaption such that WSC 216 handles all the signaling between the browser client 221 and the network end point (SIP Proxy, PSTN Gateway for example). WSC 216 is adapted to handle the message exchange using several protocols over WebSocket (RFC 6455) including, for example: JSON based protocol via JSON Stack 232; XMPP sub-protocol via XMPP Stack 234; SIP sub via SIP Stack 236; BOSH (XEP-0124); and COMET (Bayeux protocol) (not shown). On the network/carrier side the web signaling engine supports translation into a suitable communication protocol or protocols (e.g. XMPP, SIP and the like). Thus, for example, on the network/carrier side, WSC 216 supports SIP (RFC 3261).

Security for real-time communication over the Web requires that the communicating endpoints be able to authenticate each other. While these end points are making calls through the signaling services, their identities are authenticated via an Identity Provider Management Module (IDP) 239 that supports OAuth 238, Facebook Connect (FBC) 237 and other Identity Protocols using extensions 236 (e.g. OpenID connect). IDP Management modules 239 interact with internal and/or external user database and identity servers 245.

WSC 216 thereby acts as an identity service that can attest the identity of the caller of the received request and map it to the "from" identity of the outbound call. For example, WSC 216 includes OAUTH module 238 which introduces security functions that authenticate and authorize the browser-based applications to interact with the network services. WSC 216 thereby provides service providers with the ability to control any third party partner's access and usage of its network capabilities.

Establishing real-time communication over the Web also utilizes verification of service level agreements (SLA) for the user and application. SLA Management module 250 includes an authentication module 241, as well as an application SLA module 242 and network SLA module 243 which communicate with internal and/or external databases 246 to verify that the communications are provided in conformance with the relevant service level agreements for the user and application.

In a particular embodiment, WSC 216 defines a JavaScript Object Notation (JSON) protocol that is used for exchanging information and to control the set up of media between a browser client 221 and WSC 216. JSON is a lightweight data-interchange format however other data-interchange formats may be used in alternative embodiments. The JSON protocol can be used on multiple transports (COMET, BOSH, and WebSocket). When used on WebSocket transport, the protocol is defined as a sub-protocol of the WebSocket protocol.

The JSON protocol (or alternative data-interchange format) defines the basic structure for the information transfer between the browser client 221 and WSC 216. The JSON protocol defines the minimum set of messages and state machinery necessary to implement the offer/answer model. The JSON protocol defines the message structure that accounts for the reliability (reconnect, retransmissions, timeouts etc) of the message. The JSON protocol also handles the necessary headers to function in multilevel secure environment (security headers).

WSC 216 also provides an internal routing manager 233 for the routing of the requests to the appropriate end nodes based on variety of parameters. There are multiple WSE instances (see FIG. 2C) and each instance is connected to the network node serving the functionality. The incoming requests (JSON messages, for example) have to be routed to the right application and instance. WSC 216 uses routing manger 233 to route incoming requests based on their origination and destination. WSC 216 provides functionality including performing look-ups and route requests for JSON to SIP, JSON to XMPP, SIP to XMPP, XMPP to SIP. Each route in the WSE routing manager 233 has a routing profile. WSC 216 provides a default routing profile and additional routing profiles are configurable as needed or desired.

Figure 2C:
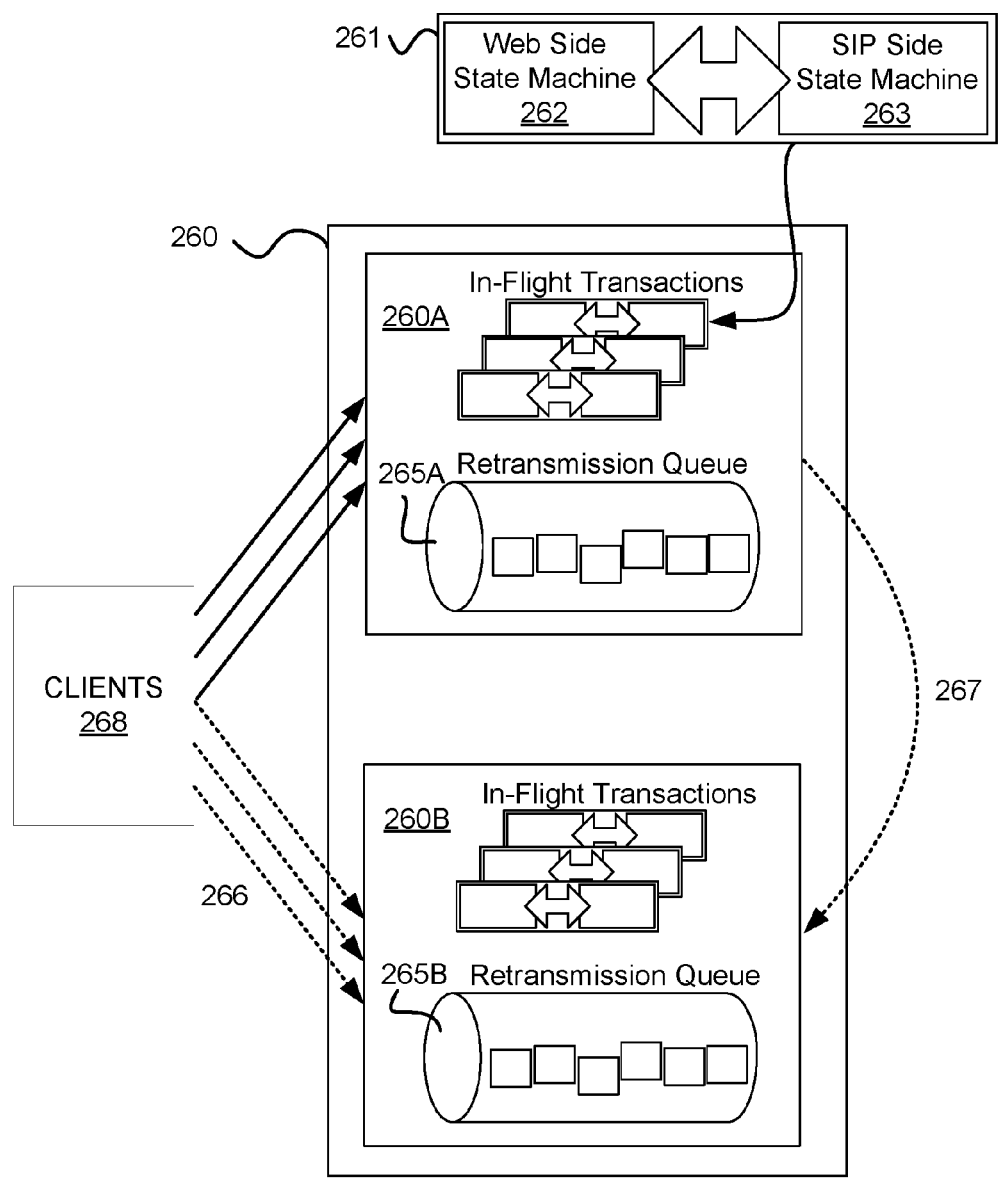
FIG. 2C shows an aspect of the server-side WebRTC Session Controller of FIG. 2B according to an embodiment of the invention.

FIG. 2C shows an aspect of WSC 216 of FIG. 2B according to an embodiment of the invention. WSC 216 maintains session control information, protocol state, dialog state, transaction state. WSC 216 provides for state maintenance and session state mapping across protocols. WSC 216 also enables hooks into the media session state. WSC 216 also maintains the SDP Agent information. WSC 216 operates to ensure reliable message exchange with clients 268.

WSC 216 ensures reconnection of clients due to failover or loss of connectivity. Clients and servers use an implicit sequence numbering protocol for the message transported by the connection. Clients and the servers each maintain their own sequence number. Both client and server acknowledge their receipt of messages by sending acknowledgement ("ack") messages. As per the protocol, an ack message indicates that the message has reached the destination (as well as all the messages lower than that sequence). Similarly an error message shall be defined (as in the JSON protocol section) to indicate that the message with a sequence number has met with an error. Retransmission Queue 265A, 265B allows for retransmission of messages for which there is an error or lack of acknowledgement.

One way in which WSC 216 maintains reliability is to keep the relevant conversation state redundant across different servers 260A, 260B having instances of WSC 216. WSC 216 provides for state maintenance and session state mapping across protocols. The relevant conversation state includes a Web Side State Machine 262 and SIP Side State Machine 263 for each In-Flight Transaction 261. WSC 216 maintains the session states (both client and server side state) in the cache. In order to ensure reliability, the cached copy of the state machines is duplicated on several servers. Additionally retransmission queue 265A, 265B is duplicated across servers 260A, 260B. WSC 216 uses coherence for state storage and management. If a server, for example server 260A cannot be contacted due to a network failure WSC 216 ensures that the state is retrieved from another active server 260B as shown by the dashed arrows 267, 266.

Figure 2D:
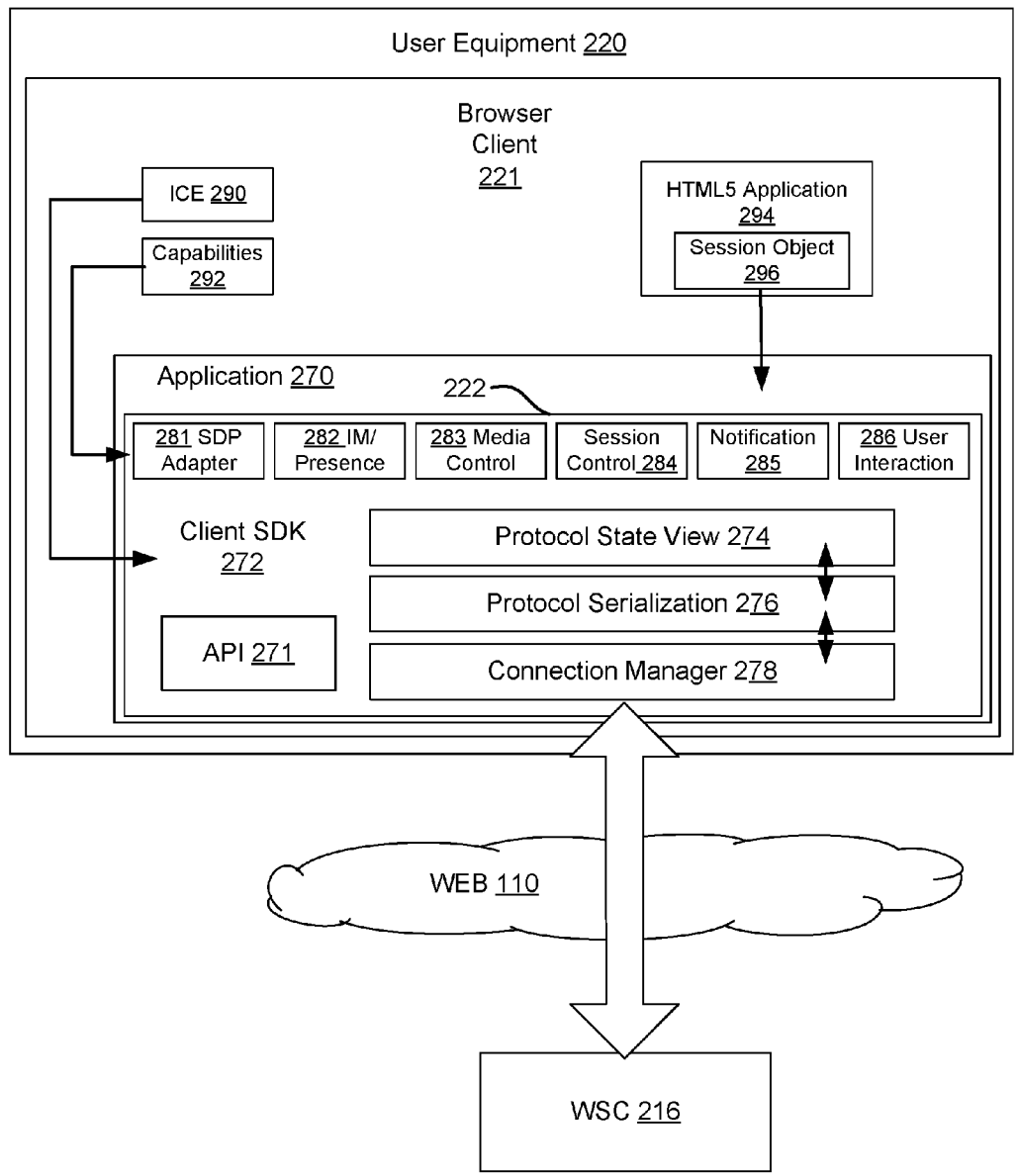
FIG. 2D shows a client-side RTC signaling controller according to an embodiment of the invention.

FIG. 2D shows an implementation of a client-side RTC signaling controller 222 as shown in FIG. 2A according to an embodiment of the invention. In an embodiment client-side RTC signaling controller 222 is implemented as part of an application 270 running on a browser client 221 (for example a JSS/CSS/HTML5 application). Application 270 is resident on user equipment 220 such that RTC signaling controller 222 manages multiplexing of signaling request/response for all client-side applications mediating communication with WSC 216 (see FIGS. 2A and 2B). Application 270 includes IM/presence module 282, media control module 283, notification module 285, and user interaction module 286.

In an embodiment application 270 is a JavaScript Application. Application 270 operates at a high level without having to deal with peer connection directly. The browser client 221 is stateless and contains as little of the implementation of the transport establishment code as possible. Browser client 221 identifies the capabilities 292 of the browser client 221 and user equipment 220 for streaming media. The capabilities 292 are provided to the SDP adapter 281 of the application 270. SDP adapter 281 provides a description of streaming media initialization parameters—a session profile—suitable for streaming media to the browser client 221 running on user equipment 220.

A client-side library of available protocols is provided as part of a Client SDK 272 in order to extend the services to the browser client 221. The particular HTTP protocol used can be defined as required by the particular native or external service, for example, JSON, XML, XMPP, Skype protocol etc. In a preferred embodiment a JSON protocol is used for communication between client-side RTC signaling controller 222 and WSC 216 as described above.

Protocol serialization 276 interacts with protocol state view 274 and connection manger 278 to communicate with WSC 216 over Web 110. Session Control 284 establishes reliable connection with WSC 216. This session can be used by the application 270 to create or invoke other objects.

RTC signaling controller 222 comprises a JavaScript SDK 272 which provides the functions necessary for application 270 to manage server connections (connection establishment, teardown via web socket). The JavaScript SDK 272 provides functions necessary to handle the state machine and functions to deal with interoperability issues. For example, the JavaScript SDK 272 of application 270 provides functions to create messages or insert messages into the state machine. The JavaScript SDK 272 also provides functions for the client to monitor connection health, including the ability to reconnect in case of stale connections and the ability to synchronize state from the server and add modified state back to the server.

JavaScript SDK 272 also provides an application programming interface (API) 271 which can modify and optimize media parameters, session description protocol (SDP) etc. The API 271 abstracts out complex functionality and provides API to deal with the real-time communication session, Call etc. The API 271 provides the ability to handle call states, media states, subscriptions and notifications.

In operation, HTML5 applications 294 access the JavaScript APIs to get access to various communication objects as defined in the API 271. An HTML5 application 294 will create a session object 296. The session object 296 acts as browser side representation of the communication. From session object 296, application 270 can create different communication objects like Call, Subscription etc. The HTML5 application can listen on the callbacks from the objects to receive incoming calls, notifications, media in the call, state changes etc.

The Interactive Connectivity Establishment (ICE) draft, developed by the IETF's MMUSIC working group, provides a framework to unify the various NAT traversal techniques. ICE defines a standardized method for clients to determine what type of firewall(s) exist between clients and determine a set of IP addresses by which clients can establish contact. When an ICE-enabled client (the initiator) wishes to communicate with another device (the responder), it first collects information on addresses where the client can receive IP traffic. A key benefit that ICE provides is the ability to unify the information provided by these various sources of IP address information to create as many paths as possible by which the endpoints can be reached.

For real-time communication over the Web, the ICE state machine 290 is maintained by the browser client 221. When the browser client 221 reloads, the application 270 has no knowledge of the ICE Candidates and is forced to perform ICE restart. In order to avoid this, application 270 can save this information in WSC 216. When the initial ICE negotiation finishes, the browser client 221 sends the nominated ICE candidate pair of IP addresses to the application 270 which saves this information in WSC 216. When the browser client 221 reloads, the application 270 will fetch the nominated ICE candidate information from the server, and then send it to the browser client 221. This will tell the browser client 221 to use these candidates for media transfer. Since the browser client 221 has kept the local nominated ICE candidate alive all the time, as long as the remote side has not released the call, the transfer will succeed.

Although the invention has been described above with respect to communication services in a telecommunications network, the invention also finds application in any situation where it is necessary or desirable to provide real-time communication signaling.

Although the invention has been described above with respect to communication services in a telecommunications network, the invention also finds application in any situation where it is necessary or desirable to provide real-time communication signaling in an HTML environment.

The present invention may be conveniently implemented using one or more conventional general purpose or specialized digital computer, computing device, machine, or microprocessor, and/or network of same, programmed according to the teachings of the present disclosure.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/ or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for real-time communication over a WebSocket connection, comprising:
    creating a session between an HTML5 application on a client-side controller and a network-side controller;
    sending, via the HTML5 application, a plurality of messages over the WebSocket connection to a network-side controller; and
    receiving at least one message in response to the plurality of messages sent over the WebSocket connection;
    wherein each message is sent or received in a separate subsession within the session, and implements a real-time communication protocol comprising a JavaScript Object Notation (JSON) object;
    wherein the JSON object includes
        a control headers section containing an identifier of the associated subsession for use in tracking the message,
        a general headers section that contains information related to a specific action that the message performs, and
        a payload.

2. The method of claim 1, further comprising processing the plurality of messages by the network-side controller, wherein the network-side controller supports a plurality of communication protocols, including the real-time communication protocol.

3. The method of claim 1, wherein the network-side controller translates the plurality of messages from the real-time communication protocol to a different protocol based on a data definition maintained in the network-side controller.

4. The method of claim 1, wherein one or more of the plurality of messages are signaling messages used to set up a call between the client-side controller and the network-side controller.

5. The method of claim 1, wherein the control headers section contains information related to at least one of reconnect, reliability and timeout of the WebSocket connection; and
    state and type of a message.

6. The method of claim 1, wherein the general headers section is extensible by adding additional headers to the section via the network-side controller.

7. The method of claim 1, wherein the payload is specific to a package used by a message, wherein the package is a type of service that the message handles.

8. The method of claim 7, wherein the payload is session description protocol information.

9. The method of claim 1, wherein the real-time communication protocol uses WebSocket ping/pong to support keep-alive, and a failure of one side to receive the keep-alive would result in a timeout of a last message.

10. A system for real-time communication over a WebSocket Connection, comprising:
    a client-side controller operating on one or more microprocessors, the client-side controller being adapted to transmit a plurality of messages over the WebSocket Connection to a network-side controller in a session established between the client-side and network-side controllers, and receive at least one message in response to the plurality of messages sent over the WebSocket Connection;
    wherein each message is sent or received in a separate subsession within the session, and implements a real-time communication protocol comprising a JavaScript Object Notation (JSON) object;
    wherein the JSON object includes
        a control headers section containing an identifier of the associated subsession for use in tracking the message,
        a general headers section that contains information related to a specific action that the message performs, and
        a payload.

11. The system of claim 10, further comprising:
    processing the plurality of messages by the network-side controller, wherein the network-side controller supports a plurality of communication protocols, including the real-time communication protocol.

12. The system of claim 10, wherein one or more of the plurality of messages are signaling messages used to set up a call between the client-side controller and the network-side controller.

13. The system of claim 10, wherein the control headers section contains information related to at least one of reconnect, reliability and timeout of the WebSocket connection; and state and type of a said message.

14. The system of claim 10, wherein the general headers section is extensible by adding additional headers to the section via the network-side controller.

15. The system of claim 10, wherein the payload is specific to a package used by a message, wherein the package is a type of service that the message handles.

16. The system of claim 15, wherein the payload is session description protocol information.

17. The system of claim 10, wherein the network-side controller translates the plurality of messages from the real-time communication protocol to a different protocol based on a data definition maintained in the network-side controller.

18. A non-transitory computer-readable storage medium storing a set of instructions for real-time communication over a WebSocket Connection, said instructions, when executed by one or more processors, causing the one or more processors to perform steps comprising:
    creating a session between an HTML5 application on a client-side controller and a network-side controller;
    sending, via the HTML5 application, a plurality of messages over the WebSocket connection to a network-side controller; and
    receiving at least one message in response to the plurality of messages sent over the WebSocket connection;
    wherein each message is sent or received in a separate subsession within the session, and implements a real-time communication protocol comprising a JavaScript Object Notation (JSON) object;

wherein the JSON object includes a control headers section containing an identifier of the associated subsession for use in tracking the message,
  a general headers section that contains information related to a specific action that the message performs, and
  a payload.

19. The non-transitory computer-readable storage medium of claim 18, further comprising;
  processing the plurality of messages by the network-side controller, wherein the network-side controller supports a plurality of communication protocols, including the real-time communication protocol.

20. The non-transitory computer-readable storage medium of claim 18, wherein one or more of the plurality of messages are signaling messages used to set up a call between the client-side controller and the network-side controller.

* * * * *